(12) United States Patent
Makino et al.

(10) Patent No.: US 11,487,166 B2
(45) Date of Patent: Nov. 1, 2022

(54) DISPLAY DEVICE

(71) Applicant: Japan Display Inc., Tokyo (JP)

(72) Inventors: Taiki Makino, Tokyo (JP); Tomokazu Ishikawa, Tokyo (JP); Yuki Kuramoto, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/524,266

(22) Filed: Nov. 11, 2021

(65) Prior Publication Data

US 2022/0066248 A1   Mar. 3, 2022

Related U.S. Application Data

(63) Continuation of application No. 17/022,507, filed on Sep. 16, 2020, now Pat. No. 11,204,526, which is a continuation of application No. 16/727,579, filed on Dec. 26, 2019, now Pat. No. 10,809,577, which is a continuation of application No. 16/255,434, filed on
(Continued)

(30) Foreign Application Priority Data

Nov. 21, 2014  (JP) ................................ 2014-236449

(51) Int. Cl.
*G02F 1/1339* (2006.01)
*G02F 1/1333* (2006.01)
*G02F 1/1345* (2006.01)

(52) U.S. Cl.
CPC ...... *G02F 1/1339* (2013.01); *G02F 1/133345* (2013.01); *G02F 1/13452* (2013.01)

(58) Field of Classification Search
CPC .................................................. G02F 1/1339
See application file for complete search history.

(56) References Cited

U.S. PATENT DOCUMENTS

2010/0014042 A1\* 1/2010 Komeno ............... G02F 1/1337
349/153
2013/0003006 A1   1/2013 Wang et al.
(Continued)

FOREIGN PATENT DOCUMENTS

JP        4-220622 A     8/1992
JP      2002-98980 A    4/2002
(Continued)

OTHER PUBLICATIONS

Office Action dated May 22, 2018 in Japanese Patent Application No. 2014-236449 (with English language translation).

*Primary Examiner* — Edmond C Lau
(74) *Attorney, Agent, or Firm* — Maier & Maier, PLLC

(57) ABSTRACT

According to one embodiment, A display device includes a first substrate includes an inorganic insulating film, a first wiring formed above the inorganic insulating film, an organic insulating film located above the inorganic insulating film and the first wiring, and a driver electrically connected to the first wiring, a second substrate opposing the first substrate, and a sealant fixing the first substrate and the second substrate, wherein the sealant comprises a first seal portion formed along a first edge of the first substrate and a second seal portion which crosses the first seal portion, and the first seal portion has a first width, and the second seal portion has a second width, the first width being greater than the second width.

9 Claims, 9 Drawing Sheets

Related U.S. Application Data

Jan. 23, 2019, now Pat. No. 10,551,685, which is a continuation of application No. 15/800,536, filed on Nov. 1, 2017, now Pat. No. 10,228,590, which is a continuation of application No. 14/943,217, filed on Nov. 17, 2015, now Pat. No. 9,829,750.

(56) References Cited

U.S. PATENT DOCUMENTS

| | | |
|---|---|---|
| 2013/0128172 A1 | 5/2013 | Ochiai et al. |
| 2015/0160486 A1 | 6/2015 | Wu |

FOREIGN PATENT DOCUMENTS

| | | |
|---|---|---|
| JP | 2003-270644 A | 9/2003 |
| JP | 2004-53815 A | 2/2004 |
| JP | 2008-46307 | 2/2008 |
| JP | 2008-151969 A | 7/2008 |
| JP | 2009-116116 A | 5/2009 |
| JP | 2013-109154 | 6/2013 |
| WO | WO 2014/024455 A1 | 2/2014 |

* cited by examiner

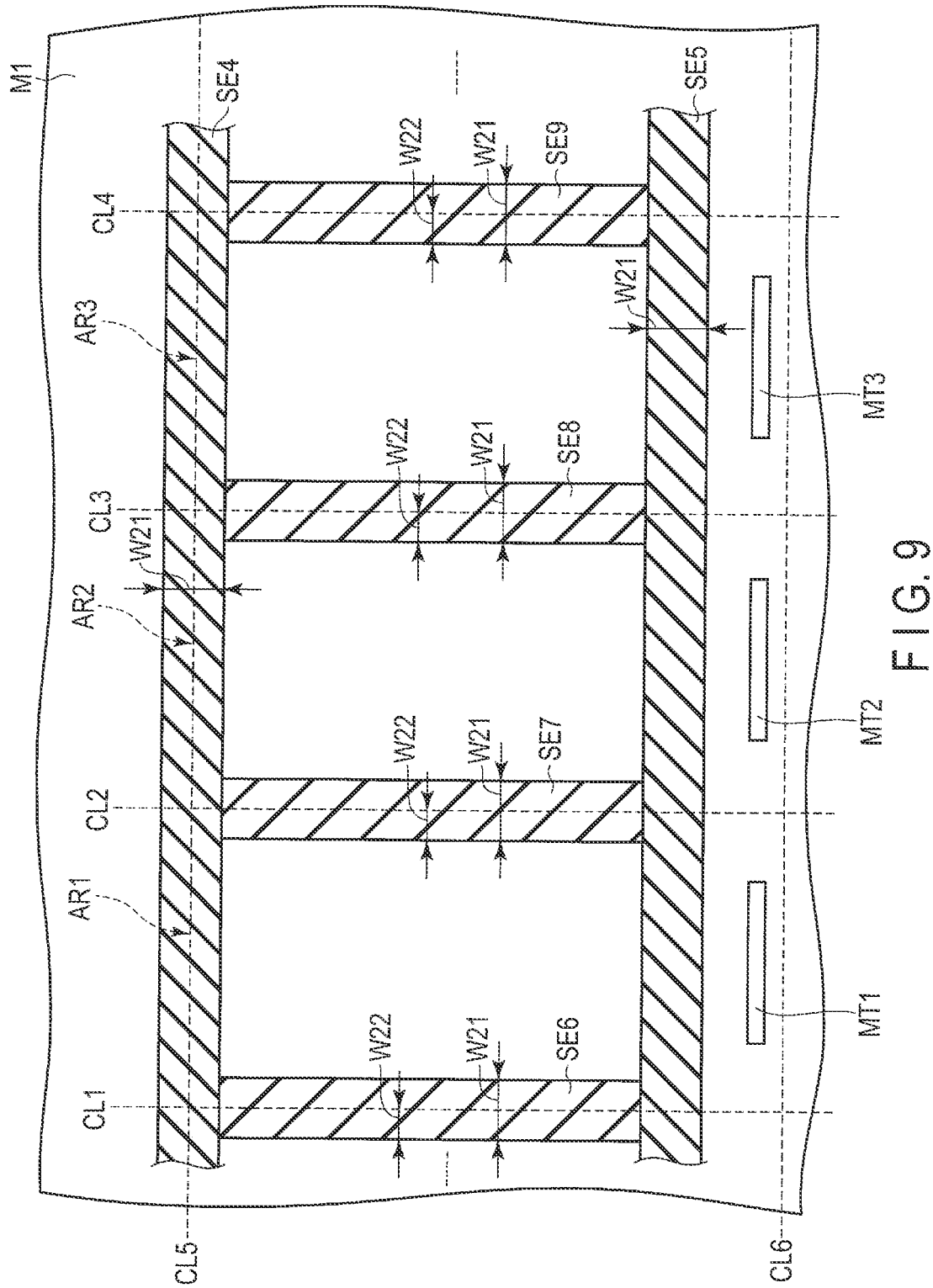
F I G. 9

DISPLAY DEVICE

CROSS-REFERENCE TO RELATED APPLICATIONS

This application is a continuation of U.S. application Ser. No. 17/022,507 filed Sep. 16, 2020, which is a continuation of U.S. application Ser. No. 16/727,579, filed Dec. 26, 2019, which is a continuation of U.S. application Ser. No. 16/255,434, filed Jan. 23, 2019, which is a continuation of U.S. application Ser. No. 15/800,536 filed Nov. 1, 2017, which is a continuation of U.S. application Ser. No. 14/943,217 filed Nov. 17, 2015 and is based upon and claims the benefit of priority from Japanese Patent Application No. 2014-236449, filed Nov. 21, 2014, the entire contents of each of which are incorporated herein by reference.

FIELD

Embodiments described herein relate generally to a display device.

BACKGROUND

In recent years, display devices including liquid crystal displays, have been used in various fields. For example, in a liquid crystal display panel, a pair of substrates which sandwich a liquid crystal layer are mutually fixed by a sealant. Here, there has been a technique disclosed, in which an insulating film provided on an wiring group is partially removed, and a pair of substrates are mutually fixed by the sealant without interposing the insulating film therebetween, in order to increase the strength of adhesion between the substrates without causing an increase in frame size.

BRIEF DESCRIPTION OF THE DRAWINGS

FIG. 9 is a schematic diagram showing a process of applying the sealant.

DETAILED DESCRIPTION

In general, according to one embodiment, a display device comprising: a first substrate comprising an inorganic insulating film, a first wiring formed above the inorganic insulating film, an organic insulating film located above the inorganic insulating film and the first wiring, and a driver electrically connected to the first wiring; a second substrate opposing the first substrate; and a sealant fixing the first substrate and the second substrate, wherein the sealant comprises a first seal portion formed along a first edge of the first substrate and a second seal portion which crosses the first seal portion, and the first seal portion has a first width, and the second seal portion has a second width, the first width being greater than the second width.

Embodiments will now be described with reference to accompanying drawings. Note that the disclosure is presented for the sake of exemplification, and any modification and variation conceived within the scope and spirit of the invention by a person having ordinary skill in the art are naturally encompassed in the scope of invention of the present application. Furthermore, a width, thickness, shape, and the like of each element are depicted schematically in the figures as compared to actual embodiments for the sake of simpler explanation, and they do not limit the interpretation of the invention of the present application. Furthermore, in the description and Figures of the present application, structural elements having the same or similar functions will be referred to by the same reference numbers and detailed explanations of them that are considered redundant may be omitted.

First, a display device according to this embodiment will now be described in detail.

Figure 1:
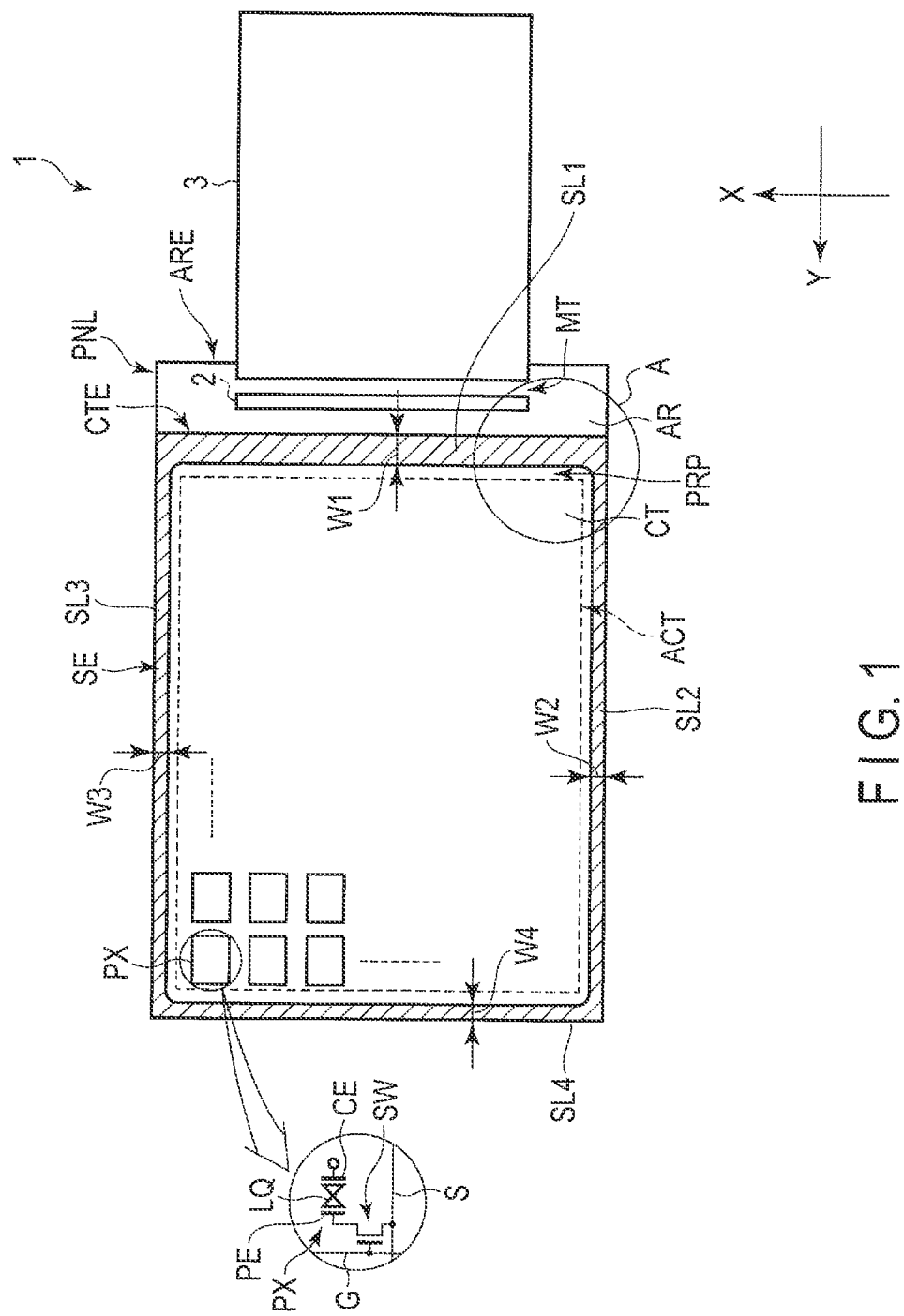
FIG. 1 is a diagram showing a structure and an equivalent circuit of a display panel, which is a part of a display device of this embodiment.

FIG. 1 is a diagram showing a structure and an equivalent circuit of a display panel, which is a part of a display device of this embodiment. Note that this embodiment describes a case where the display device includes a liquid crystal display panel, but the embodiment is not limited to this. The display device may comprise, as a display panel, a self-luminous display panel such as of organic electroluminescence, or an electronic paper display panel of an electrophoretic element, or the like.

Here, FIG. 1 shows a plan view of a display panel PNL in an X-Y plane defined in a first direction X and a second direction Y crossing with each other. In this specification, the first direction X and the second direction Y are not limited to the directions indicated by arrows in the figure, but directions may also be 180 degree opposite to those indicated by the arrows.

That is, the display panel PNL comprises an array substrate (first substrate) AR, a countersubstrate (second substrate) CT arranged to oppose the array substrate AR, and a liquid crystal layer LQ held between the array substrate AR and the countersubstrate CT. The array substrate AR and the countersubstrate CT are mutually fixed with a sealant SE, while forming a predetermined cell gap therebetween. The liquid crystal layer LQ is held in the cell gap between the array substrate AR and the countersubstrate CT at an inner side surrounded by the sealant SE. The display panel PNL includes an active area (display area) ACT configured to display images, at the inner side surrounded by the sealant SE. The active area ACT is, for example, substantially rectangular and comprises a plurality of pixels PX arranged in matrix. Note that the active area ACT may be polygonal other than rectangular and the edges thereof may be formed in a curved shape.

The array substrate AR comprises, in the active area ACT, gate lines G extended along the first direction X, source lines S extended along the second direction Y, switching elements SW each electrically connected to a respective gate line G and a respective source line S in a respective pixel PX, pixel electrodes PE each electrically connected to a respective switching element SW in a respective pixel PX, and the like. A common electrode CE is provided at least one of the array substrate AR and the countersubstrate CT.

Although a detailed explanation regarding the structure of the display panel PNL will be omitted, it should be noted here that in a display mode which uses a vertical electric field along a normal of the major surface (X-Y plane) of the substrate, such as TN (twisted nematic) mode, OCB (optically compensated bend) mode or VA (vertical aligned) mode, or in a display mode which uses a tilted electric field inclined in an oblique direction to the major surface of the substrate, the pixel electrodes PE are provided on the array substrate AR, whereas the common electrode CE is provided on the countersubstrate CT. Moreover, in a display mode which uses a lateral electric field along the major surface of the substrate, such as IPS (In-Plane Switching) mode, or FFS (Fringe Field Switching) mode, which is one of IPS modes, both of the pixel electrodes PE and the common electrode CE are provided in the array substrate AR. Further, the display panel PNL may have a structure compatible with a display mode which utilizes the vertical electric field, lateral electric field and tilted electric field in combination appropriately.

Further, the display panel PNL may be constituted as a transmissive type panel which displays images by selectively transmitting light from the backlight unit arranged at the back side thereof, or as a reflective type panel which displays images by selectively reflecting outside light entering the display panel PNL, or a transflective type panel which is a combination of the transmissive type and the reflective type.

Supply sources of signals required to drive the display panels PNL, such as a drive IC chip 2 and a flexible printed circuit (FPC) board 3 are located in a peripheral area PRP (non-display area) outside the active area (display area) ACT. In the example illustrated, the drive IC chip 2 and the FPC board 3 are mounted in the mount unit MT of the array substrate AR extending outward from a substrate end CTE of the countersubstrate CT. The mount unit MT is formed along a substrate end ARE of the array substrate AR. The mount unit MT comprises pads electrically connected to the signal supply sources, details of which are not provided here. The pads include those electrically connected to the gate lines, source lines, and the like. In the illustrated example, the other three substrate ends of the countersubstrate CT oppose the other three substrate ends of the array substrate AR. Note that the mount unit MT may be formed not only in one substrate end of the array substrate, but in two substrate ends or three or more substrate ends. Further, even if the array substrate is formed in other polygonal shape, the mount unit MT can be provided as described above.

The sealant SE is formed into a frame shape which encloses the active area ACT. In the illustrated example, the sealant SE is formed into a rectangular shape. That is, the sealant SE comprises a first seal portion SL1, a second seal portion SL2, a third seal portion SL3 and a fourth seal portion SL4. The first seal portion SL1 and the fourth seal portion SL4 each extend along the first direction X and oppose to each other across the active area ACT in the X-Y plane. The second seal portion SL2 and the third seal portion SL3 each extend along the second direction Y and oppose to each other across the active area ACT in the X-Y plane. The first seal portion SL1 is formed along the end of the first substrate. The second seal portion SL2 and the third seal portion SL3 cross the first seal portion SL1 respectively in both ends of the first seal portion SL1. The fourth seal portion SL4 crosses, by its both ends, the second seal portion SL2 and the third seal portion SL3, respectively. The first seal portion SL1 is formed to be wider than the second seal portion SL2, the third seal portion SL3 and the fourth seal portion SL4. As an example, a first width W1 of the first seal portion SL1 is greater than a second width W2 of the second seal portion SL2. The first width W1 is 1.5 to 4 times the second width W2, and should preferably be 1.5 to 2.5 times the second width W2. Further, the first width W1 is greater than a third width W3 of the third seal portion SL3. The first width W1 is greater than a fourth width W4 of the fourth seal portion SL4. The second width W2, the third width W3 and the fourth width W4 may be equal to or different from each other. Note that the width of a seal portion is that in a longitudinally central portion of the seal portion, or that in a central portion when each seal material is longitudinal divided into three equal parts.

Figure 2:
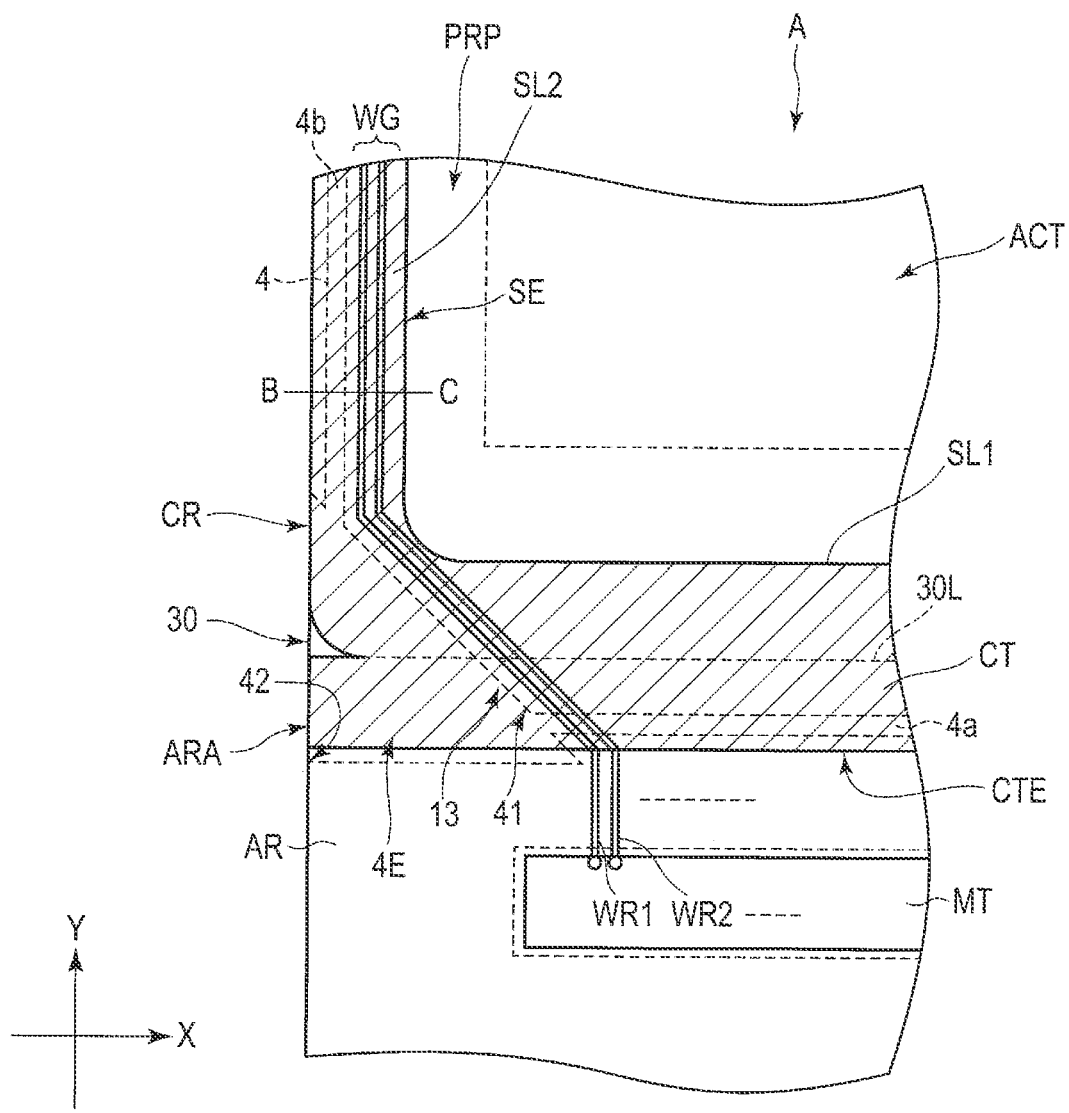
FIG. 2 is an enlarged diagram showing an area A of the display panel shown in FIG. 1.

FIG. 2 is an enlarged diagram showing the area A of the display panel PNL shown in FIG. 1. The area A illustrated is an area containing an crossing portion CR where the first seal portion SL1 and the second seal portion SL2 cross in the sealant SE. Note that a structure similar to that of the area A shown in FIG. 2 is applied also to the area containing the crossing portion where the first seal portion SL1 and the third seal portion SL3 cross each other, shown in FIG. 1, and therefore an explanation thereof is omitted.

In the illustrated example, a void 30, where the sealant SE is not extended, is formed in the crossing portion CR, but the void 30 may disappear. Moreover, the dashed line drawn along the direction first X from the void 30 indicates a boundary line 30L between sealant materials applied in two separate drawing processes. The boundary line 30L disappears as each sealant material spreads in the width direction and cures thereafter. Note that the sealant materials applied on both sides of the boundary line 30L may be separated apart from each other. In such a sealant SE, the first seal portion SL1 is formed to be wider than the second seal portion SL2. Note that the way to apply the sealant material is not limited to drawing using a dispenser, but may be printing using a printing plate or drawing using an ink jet. In this case, the boundary line 30L may not be present.

The array substrate AR comprises an wiring group WG, a third insulating film (organic insulating film, which will be described later) 13, and the like. The wiring group WG includes a plurality of wirings WR1, WR2, ..., arranged in a peripheral area PRP. In the illustrated example, the wiring WR1 is the outermost circumferential wiring formed closest to the substrate end ARA of the array substrate AR. The wirings WR1, WR2, ..., are electrically connected to the drive IC chip in the mount unit MT. The wiring WR1, WR2, ..., are, for example, source lines and gate lines led out from the active area ACT to the peripheral area PRP, and various wirings to which control signals, clock signals, power supplies, etc. are supplied to the circuits formed in the peripheral area.

The third insulating film 13 is formed in a region overlaps the wiring group WG. In the illustrated example, the third insulating film 13 is formed to overlap with all the wirings of the wiring group WG including the outermost circumferential wiring. A groove 4 is formed in the third insulating film 13. The groove 4 includes a first groove portion 4a and a second groove portion 4b. The first groove portion 4a is formed in the region which overlaps with the first seal portion SL1 along the first direction X. The first groove portion 4a crosses the wirings WR1, WR2, .... The second groove portion 4b is formed in the region which overlaps with the second seal portion SL2 along the second direction Y. The second groove portion 4b is formed along the wiring WR1. The third insulating film 13 includes a removed area 4E extended to a position which opposes the substrate end CTE of the countersubstrate CT in the crossing portion CR. The removed area 4E is a region where the third insulating film 13 is not formed and is connected with the first groove portion 4*a* and the second groove portion 4*b*. Note that the third insulating film 13 may be formed in the removed area 4E. Here, the third insulating film 13 in the removed area 4E is formed to be thinner than the third insulating film 13 in the active area.

In the illustrated example, the removed area 4E is extended to the substrate end ARA of the array substrate AR. Such a removed area 4E is formed into, substantially, a triangle shape, for example. An oblique side 41 of the removed area 4E is extended along the wiring WR1, the outermost circumferential wiring. A vertex angle 42 opposing the oblique side 41 of the removed area 4E is located near the crossing of the substrate end ARA and the substrate end CTE. The third insulating film 13 is not formed in the mount unit MT in a region where the drive IC chip 2 is arranged. The removed area 4E may be extended to a region where the third insulating film 13 is not formed in the mount unit MT.

Figure 3:
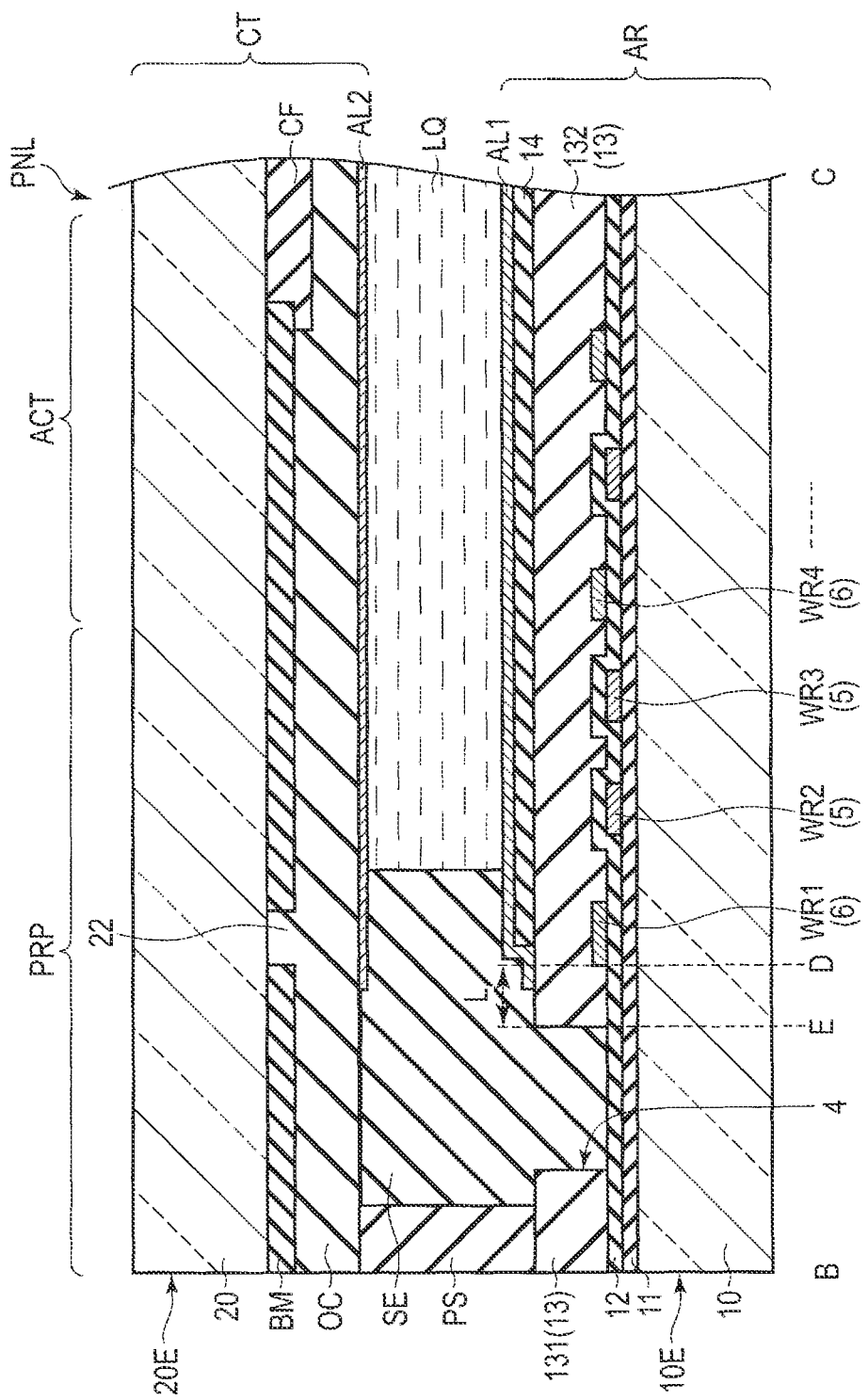
FIG. 3 is a cross-section of the display panel, taken along the line B-C in FIG. 2.

FIG. 3 is a diagram showing a section of the display panel PNL taken along in the line B-C in FIG. 2. Note that FIG. 3 mainly shows the structure of the display panel PNL in the peripheral area PRP and omits a detailed structure of the display panel PNL in the active area ACT.

The display panel PNL comprises the array substrate AR, the countersubstrate CT opposing the array substrate AR and the liquid crystal layer LQ held between the array substrate AR and the countersubstrate CT. The array substrate AR and the countersubstrate CT are mutually fixed with the sealant SE in the peripheral area PRP.

In the explanation of the array substrate AR, the expression indicating an "upward" direction is meant a side close to the countersubstrate CT. The array substrate AR comprises a first insulating substrate 10, a first wiring 5, a second wiring 6, a first insulating film 11, a second insulating film 12, a third insulating film 13, a fourth insulating film 14, a first alignment film AL1 and the like. The first insulating substrate 10 is formed from a material such as glass or resin. The first insulating substrate 10 is covered by the first insulating film 11. Note that some other insulating film, electrode, wiring, etc. may be interposed between the first insulating substrate 10 and the first insulating film 11. The first wiring 5 is formed on the first insulating film 11. In the illustrated example, the wiring WR2, wiring WR3 and the like correspond to the first wiring 5. The second insulating film 12 covers the first wiring 5 and the first insulating film 11. The second wiring 6 is formed on the second insulating film 12. In the illustrated example, the wiring WR1, wiring WR4 and the like correspond to the second wiring 6. The third insulating film 13 covers the second wiring 6 and the second insulating film 12. The first wiring 5 and the second wiring 6 are formed of metals, for example, molybdenum (Mo), tungsten (W), aluminum (Al) and titanium (Ti).

The first insulating film 11 and the second insulating film 12 are inorganic insulating films and formed of inorganic materials, for example, silicon oxide (SiO) and silicon nitride (SiN). As mentioned above, the third insulating film 13 is an organic insulating film and formed of an organic material, for example, one of various types of resins. The third insulating film 13 is formed thicker than the first insulating film 11 or the second insulating film 12.

In the illustrated example, the first insulating film 11 and the second insulating film 12 are formed in substantially continuously from the active area ACT over to the peripheral area PRP, and is extended to the substrate end 10E of the first insulating substrate 10. The third insulating film 13 is interrupted by the groove 4 made through to the second insulating film 12 in the peripheral area PRP. That is, the Third insulating film 13 is separated into a first segment 131 located in the substrate end 10E side and a second segment 132 extended to the active area ACT side in the peripheral area PRP. Note that the removed area 4E shown in FIG. 2 is made through to the second insulating film 12 as so is the groove 4, although a detail explanation thereof is not provided.

A distance L, between an end D on the groove 4 side of the outermost circumferential wiring, the wiring WR1 and an end E facing the groove 4 of the third insulating film 13 is set to, for example, 10 µm or more.

In the illustrated example, the fourth insulating film 14 is formed on the third insulating film 13. The fourth insulating 14 is an inorganic insulating film and formed of an inorganic material, for example, silicon nitride (SiN). The fourth insulating film 14 may be formed substantially continuously from the active area ACT over to the peripheral area PRP as illustrated, and it may be formed only in the active area ACT. For example, in the structure that the array substrate AR comprises pixel electrodes and a common electrode, the fourth insulating film 14 is equivalent to an interlayer insulating film interposed between the pixel electrodes and the common electrode. Note that the fourth insulating film 14 may be omitted in a display mode which uses a vertical electric field or a tilted electric field.

The first alignment film AL1 is formed on the fourth insulating 14 and disposed on a surface of the array substrate AR, which is in contact with the liquid crystal layer LQ. In FIG. 3, the end of a first alignment film AL1 is located in a formation area for the sealant SE, but may be extended up to the substrate end 10E of the first insulating substrate 10.

In the meantime, the countersubstrate CT comprises a second insulating substrate 20, a light shielding layer BM, a color filter CF, an overcoat layer OC, a second alignment film AL2 and the like. The second insulating substrate 20 is formed from a material such as glass or resin.

The light shielding layer BM is formed on a side of the second insulating substrate 20, which opposes the array substrate AR. Although not explained in full detail, the light shielding layer BM is formed so as to define each pixel in the active area ACT. Further, the light shielding layer BM is expanded substantially over the entirety of the peripheral area PRP. Note that in the illustrated example, the light shielding layer BM comprises a slit 22. The slit 22 opposes, for example, the wiring WR1. For example, the slit 22 is narrower than or as wide as the wiring WR1.

The color filter CF is formed in the active area ACT, on a side of the second insulating substrate 20, which opposes the array substrate AR and the end thereof overlaps the light shielding layer BM. The color filter CF is formed of a colored resin material. Note that the color filter CF may be provided on the array substrate AR.

The overcoat layer OC covers the color filter CF and the light shielding layer BM. The overcoat layer OC is formed of a transparent resin material. The second alignment film AL2 is formed on a side of the overcoat layer OC, which opposes the array substrate AR, and disposed on a surface of the counter substrate CT, which is in contact with the liquid crystal layer LQ.

In the illustrated example, the display panel PNL further comprises a spacer PS interposed between the array substrate AR and the countersubstrate CT. The spacer PS is located in a region where the substrate end 10E of the first insulating substrate 10 and the substrate end 20E of the second insulating substrate 20 oppose each other. For example, the spacer PS is provided on the countersubstrate CT and is formed on a side of the overcoat layer OC, which opposes the array substrate AR. An end of the spacer PS is in contact with the first segment 131 of the third insulating film 13. The spacer PS may be formed into the shape of a wall extending continuously in a normal direction of the drawing, or a discontinuous wall, or dotted pillars. Further, the spacer SP may be formed on an array substrate AR side. Although the drawings shows the spacer PS provided in the substrate end, some other spacer PS may be provided in the active area ACT or the peripheral area PRP.

The array substrate AR and the countersubstrate CT are mutually fixed with the sealant SE. The sealant SE fills the groove 4 as well and it is brought into contact with the upper and side surfaces of the third insulating film 13 and also the second insulating film 12 exposed in the groove 9. The liquid crystal layer LQ is sealed in between the first alignment film AL1 of the array substrate AR and the second alignment film AL2 of the countersubstrate CT.

According to this embodiment, the sealant SE comprises the first seal portion SL1 formed along the mount unit MT and the second seal portion SL2 which crosses the first seal portion SL1, and the first width W1 of the first seal portion SL1 is greater than the second width W2 of the second seal portion SL2. That is, a greater amount of sealant SE is applied by the mount unit MT side of the peripheral area PRP, which does not contribute to display. For this reason, it is possible to suppress the reduction in the strength of adhesion of the seal formed by the sealant SE. Therefore, detachment of the sealant SE is suppressed and a display device with an improved reliability can be provided.

Moreover, since the strength of adhesion of the seal by the sealant SE is ensured in the first seal portion SL1 set along the mount unit MT, a portion of the sealant SE other than the first seal portion SL1 can be made narrower than the first seal portion SL1. That is, in the frame-shaped peripheral area PRP, the sides other than that along the mount unit MT can be narrowed, and therefore, the frame portion can be narrowed. According to an example, in a display device having a narrow frame in its specification in which the width of the sides other than that along the mount unit MT was set to 1 mm or less, a sufficient strength of adhesion of the seal formed by the sealant SE is ensured.

Further, according to this embodiment, the groove 4 is formed in the third insulating film 13, which is an organic insulating film of the display panel PNL. With the groove thus formed, the contact area between the sealant SE and the array substrate AR is increased, and the strength of adhesion of the seal by the sealant SE can be increased. Or, when the groove 4 of the third insulating film 13 is made through to the second insulating film 12, which is an inorganic insulating film, the sealant SE adheres not only to the third insulating film 13 but also the second insulating film 12 in the groove 4. As shown in FIG. 3, the array substrate AR has a multi-layered structure in which the second insulating film 12 of an inorganic material and the third insulating film 13 of an organic material are stacked. In the interface between an inorganic insulating film and an organic insulating film as such, the possibility of occurrence of detachment is high as compared to the case of a multi-layered structure of an inorganic insulating film and an inorganic insulating film or that of an organic insulating film and an organic insulating film. Therefore, the sealant SE directly adheres not only to the third insulating film 13, an organic insulating film, but also the second insulating film 12, an inorganic insulating film, and thus it is possible to suppress the detachment in the interface between the second insulating film 12 and the third insulating film 13. Consequently, it becomes possible to further strengthen the adhesion of the sealant SE to the array substrate AR.

Note that the countersubstrate CT has a multi-layered structure that organic insulating films such as the overcoat layer OC and the light shielding layer BM are stacked, there is a tendency that the detachment in the interface between layers does not easily occur.

Further, the third insulating film 13 comprises, in the crossing where the first seal portion SL1 and the second seal portion SL2 cross, the removed area 4E connected with the groove 4 and made through to the second insulating film 12. The removed area 4E is extended to the substrate end CTE of the countersubstrate CT. That is, in the removed area 4E, the area in which the sealant SE is in contact with the second insulating 12 is expanded, and therefore it becomes possible to further strengthen the adhesion between the array substrate AR and the countersubstrate CT with the sealant SE. In particular, when the removed area 4E is formed in a triangle shape and its oblique side is extending in the wiring direction of the wiring group WG of the peripheral area PRP, it is possible to expand the adhesion area between the sealant SE and the second insulating film 12 while most of the wiring group WG is covered by the third insulating film 13.

According to this embodiment, the third insulating film 13 is divided by the groove 4 into the first segment 131 on the side of the substrate end 10E and the second segment 132 on the side of the active area ACT. The third insulating film 13, which is an organic insulating film, may be formed of a material having a water permeability higher than that of the inorganic insulating film. Even in such a case, because of the groove 4 of the third insulating film 13, the permeation path of moisture is blocked and it is possible to suppress entering of moisture which proceeds from the exterior of the display panel PNL towards the active area ACT. Therefore, it is possible to suppress the occurrence of troubles (for example, degradations of the liquid crystal material, wirings, etc.) caused by the entering of moisture.

Moreover, in the example shown in FIG. 3, the light shielding layer BM comprises the slit 22. With this structure, even if the light shielding layer BM is formed of a material having high water permeability, the entering of moisture from an exterior of the display panel PNL can be suppressed with the slit 22 of the light shielding layer BM. Note that, within the wiring group WG of the array substrate AR, at least one wiring (wiring WR1 in the example shown in FIG. 3) opposes the slit 22 of the light shielding layer BM, and with this structure, the leakage of the light irradiated from a lower part of the array substrate AR can be suppressed.

Further, according to this embodiment, the spacer PS is interposed between the array substrate AR and the countersubstrate CT in the peripheral area PRP. For this reason, it becomes possible to maintain the gap between the array substrate AR and the countersubstrate CT in the peripheral area PRP. Furthermore, the display panel PNL, which comprises the array substrate AR and the countersubstrate CT, is manufactured, for example, by attaching together a first motherboard for preparing a number of array substrates AR and a second motherboard for preparing a number of countersubstrates CT with the sealant SE, and then cutting it. Here, the spacer PS is provided in each of the cut lines of the first motherboard and the second motherboard, and with this structure, the sealant SE is hardly present in the cut lines. For this reason, the external stress applied during the cuttings, concentrates toward the spacer PS, which makes it possible to suppress cutting error of the motherboards. Moreover, the sealant SE is hardly provided at the position along each cut line, each cut piece of display panel PNL can be easily separated.

Moreover, according to this embodiment, the distance L between the end D of wiring WR1, the outermost circumferential wiring, and the end E of the third insulating film 13 is set to 10 μm or more. With the groove 4, the permeation path of moisture is blocked, which makes it possible to suppress the effect on the wiring WR1 by the moisture from outside. Further, the wiring WR1 is covered by the third insulating film 13, a comparatively thick film, and therefore the wiring WR1 can be protected from constituents for example, fibers) or the sealant SE while the array substrate AR and the countersubstrate CT are subjected to contact bonding.

When the outermost circumferential wiring is covered by the second insulating film 12, which is an inorganic insulating film, the third insulating film 13 is not necessarily placed in a position overlapping the outermost circumferential wiring. In order to prioritize the narrowing of the frame, it is also possible to form a groove 4 made not through to the second insulating film 12 in a region where the second wiring 6 and the like are formed. Or, such a structure may be also possible, in which the groove 4 is made through the third insulating film to the second insulating film 12 and some portion of the third insulating film is left to remain partially in the removed area 4E. Further, it is also possible to make the distance L in the removed area greater than the distance L in the groove 4. Note that it is not necessary to set the wiring WR1 and the oblique side 41 parallel to each other, and the distance L in the central portion of the oblique side 41 may be greater than the distance L in the end of the oblique side 41.

Next, a modification of this embodiment will now be described.

Figure 4:
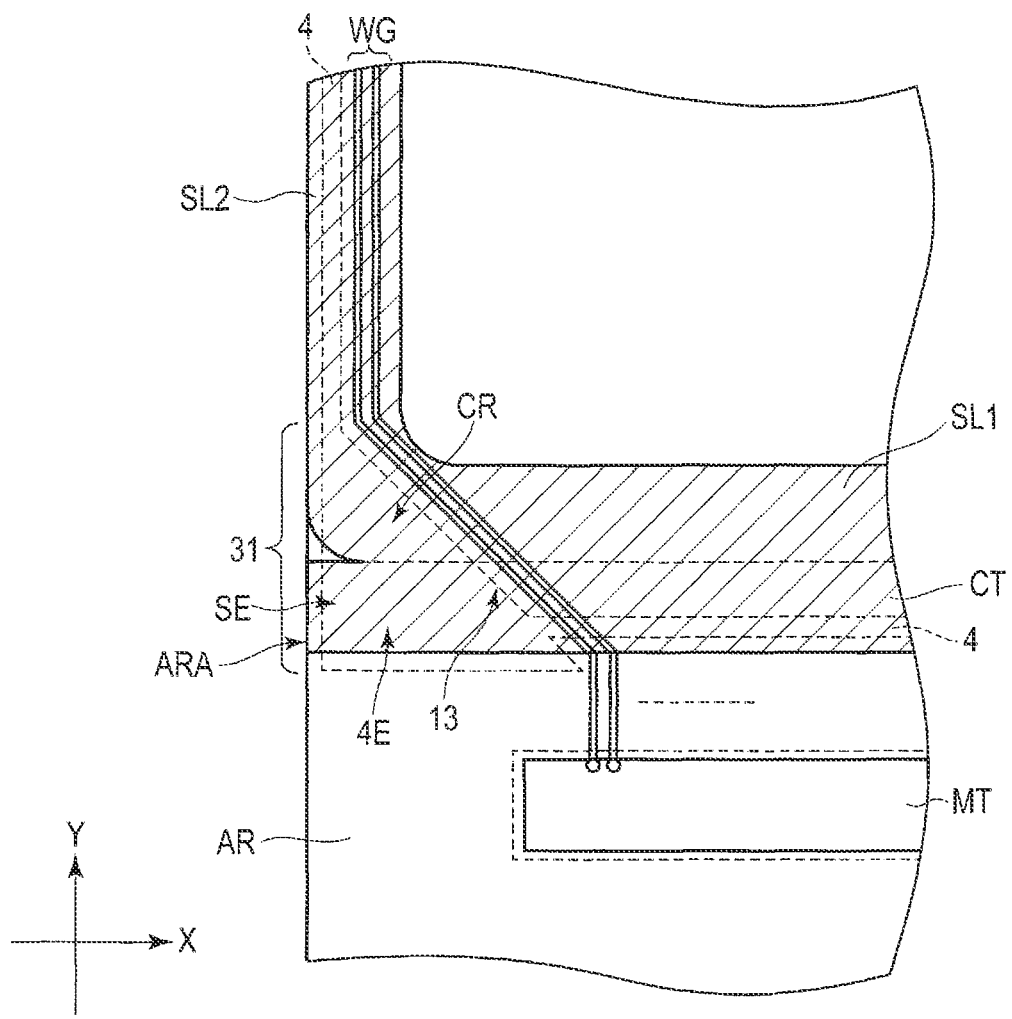
FIG. 4 is a diagram showing a first modification of this embodiment.

FIG. 4 shows a first modification according to this embodiment. As compared with the structural example shown in FIG. 2, the first modification is different in that the third insulating film 13 is formed up to the region 31 along the substrate end ARA of the array substrate AR. In other words, the removed area 4E of the third insulating film 13 is not extended to the substrate end ARA. The spacer PS opposes the third insulating film 13 formed in the region 31 as in the example shown in FIG. 3. In the sealant SE, the first seal portion SL1 is formed to be wider than the second seal portion SL2 as in the case of the above-provided structural example.

Also in such a modification, an effect similar to that of the above-provided structural example can be obtained. Further, with the third insulating film 13 formed along the substrate end ARA of the array substrate AR, it becomes possible to dispose the spacer PS to oppose the third insulating film 13. With this structure, it becomes possible in the peripheral area PRP to keep the gap between the array substrate AR and the countersubstrate CT more stably.

Figure 5:
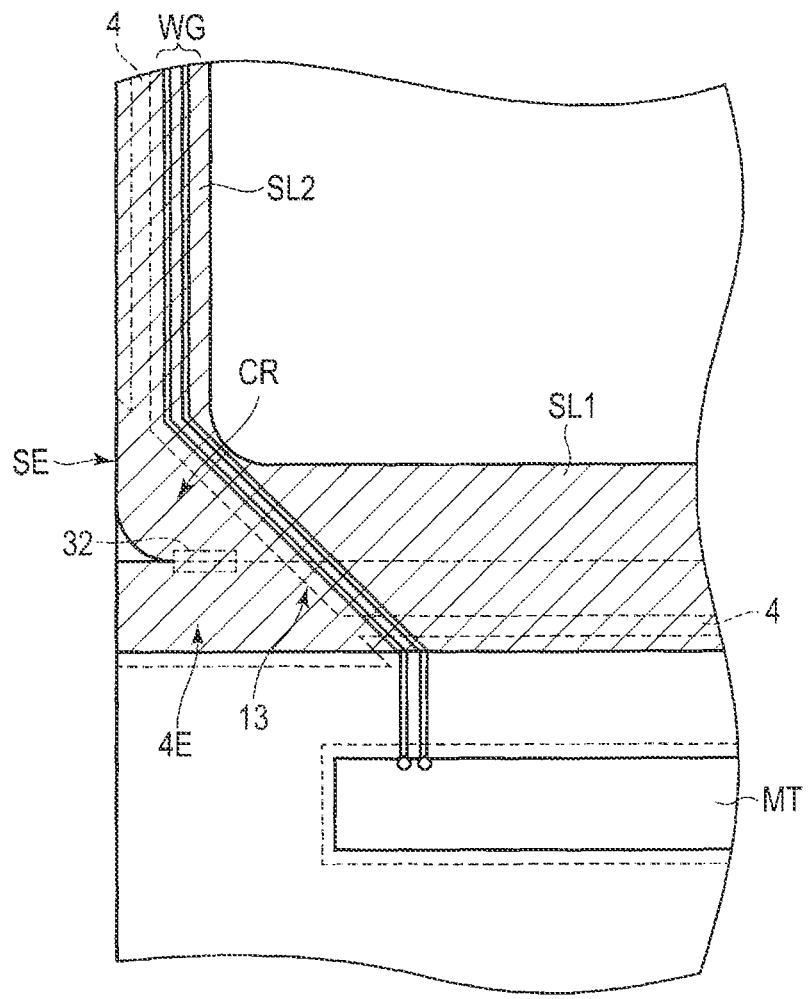
FIG. 5 is a diagram showing a second modification of this embodiment.

FIG. 5 shows a second modification according to this embodiment. As compared with the structural example shown in FIG. 2, the second modification is different in that an island 32 of the third insulating film 13 is formed inside the removed area 4E formed in substantially a triangle shape. The spacer PS opposes the island 32 as in the first modification. Note that the shape and/or size of the island 32 are not particularly limited as long as the adhesion area between the groove 4 and the removed area 4E and the sealant SE is kept a predetermined criterion. Also, not only one, but two or more islands may be provided. Also in such a modification, an effect similar to that of the above-provided structural example can be obtained.

Figure 6:
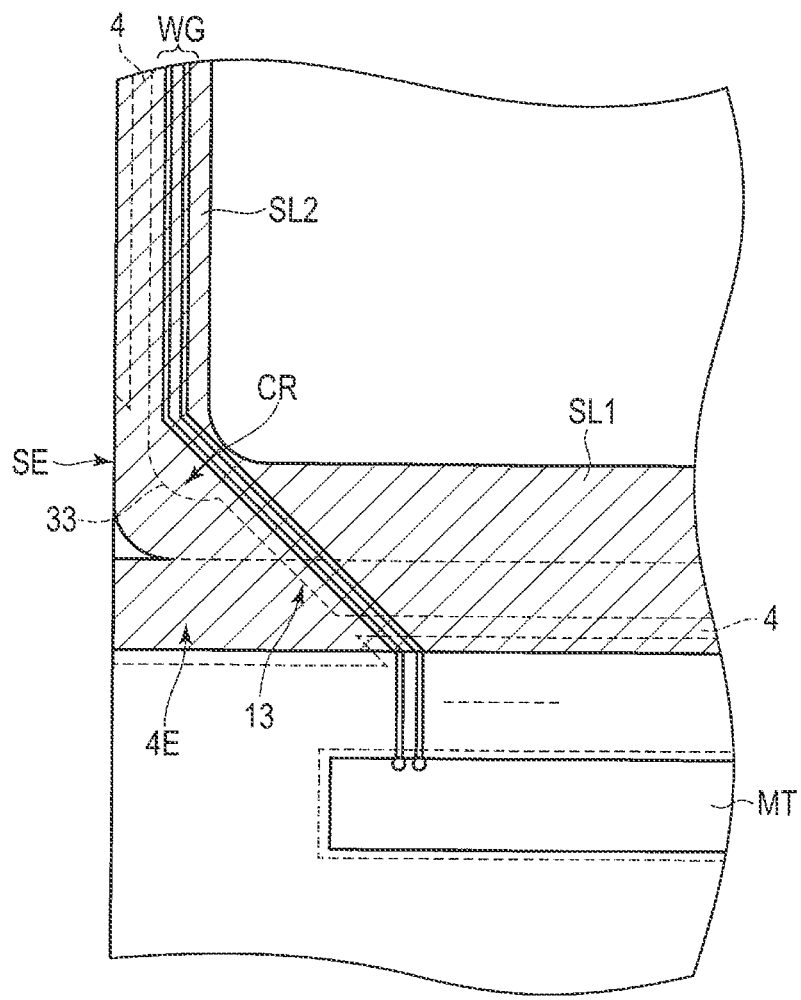
FIG. 6 is a diagram showing a third modification of this embodiment.

FIG. 6 shows a third modification according to this embodiment. As compared with the structural example shown in FIG. 2, the third modification is different in that an end opposing the removed area 4E of the third insulating film 13 (or the oblique side of the removed area 4E) includes a curved portion 33. The curved portion 33 is formed in, for example, a curved shape along the crossing portion CR of the sealant SE. In one example, the curved portion 33 is formed along the locus of applying the sealant SE.

Also in such a modification, an effect similar to that of the above-provided structural example can be obtained. In addition, even if the end facing the removed area 4E of the third insulating film 13 has a shape of a comparatively large step equivalent to the thickness of the third insulating film 13 (for example, 2 μm), it becomes easy to apply more amount of sealant SE on the upper surface of the third insulating film 13 because of the curved portion 33 formed as above. Or even if the application location of the sealant SE may vary, it is possible to apply the sealant SE on the upper surface and the removed area 4E of the third insulating film 13 without deviation with the curved portion 33 formed as above. For this reason, it is possible to suppress the reduction of the strength of adhesion resulting from the deviation of the sealant SE.

Figure 7:
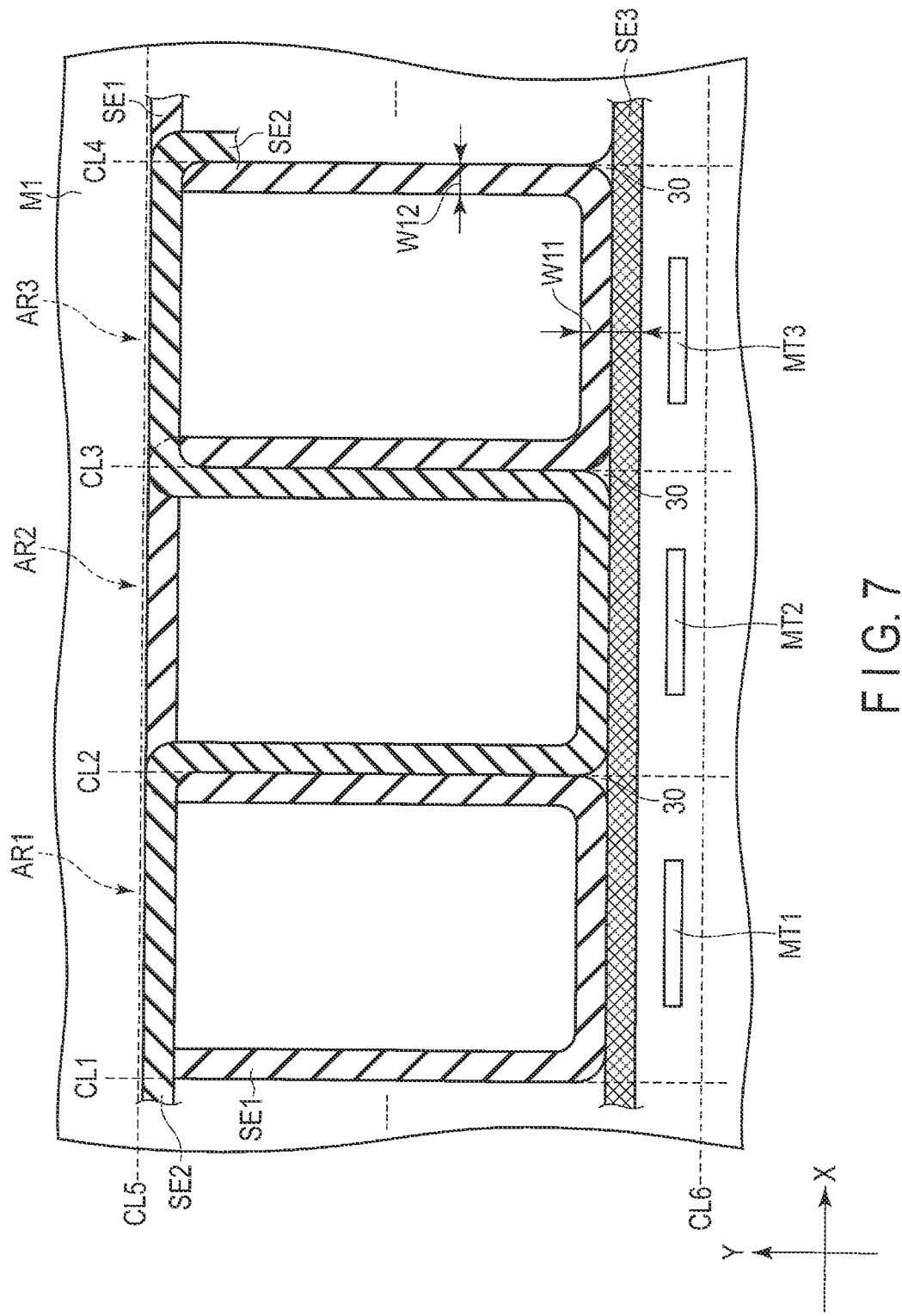
FIG. 7 is a schematic diagram showing a process of applying the sealant.

FIG. 7 schematically shows a process of applying the sealant. In one example, sealants SE1, SE2 and SE3 are applied on one major surface of the first motherboard M1 for forming the array substrate AR (that is the side to which the second motherboard is fixed, which later gives rise to the countersubstrate CT). Here, the figure illustrates a layout of the sealants for three array substrates. Note that the order of applying the sealants SE1, SE2 and SE3 is not particularly limited.

The array substrate AR1 is formed as it is cut along cut lines CL1 and CL2 in the second direction Y and cut lines CL5 and CL6 of the first direction X. The array substrate AR2 is formed as it is cut along cut lines CL2 and CL3 in the second direction Y and cut lines CL5 and CL6 of the first direction X. The array substrate AR3 is formed as it is cut along cut lines CL3 and CL4 in the second direction Y and cut lines CL5 and CL6 of the first direction X.

The sealant SE1 is applied in the following manner continuously without intermission. That is, in the region of the array substrate AR1, the sealant SE1 is applied, first, along the cut line CL1, then along the cut line CL6 on a side closer to the cut line CL5, and thereafter, along the cut line CL2. Continuously, in the region of the array substrate AR2, it is applied along the cut line CL5, and then in the region of the array substrate AR3, applied along the cut line CL3, then along the cut line CL6 on a side closer to the cut line CL5, and thereafter along the cut line CL4.

The sealant SE2 is applied in the following manner continuously without intermission. That is, in the region of the array substrate AR1, the sealant SE2 is applied, first, along the cut line CL5, and then in the region of the array substrate AR2, applied along the cut line CL2, then along the cut line CL6 on a side closer to the cut line CL5, and thereafter along the cut line CL3. Continuously, in the region of the array substrate AR3, it is applied along the cut line CL5.

The sealant SE3 is applied, in each respective region of the array substrates AR1 to AR3, continuously without intermission in parallel to the cut line CL6 to be adjacent to the sealant SE1 and sealant SE2. In other words, the sealing portions formed respectively along the mount units MT1 to MT3 of the array substrates AR1 to AR3 are formed by applying the sealant SE twice. When the sealants SE1 to SE3 are all applied to have a substantially equal width W12, the width W11 of the sealing portions formed along the mount units MT1 to MT3 becomes approximately twice the width W12. Note that when the application width of the sealant SE3 is set differently from that of the sealants SE1 and SE2, it is also possible to set the width 11 to be other than twice the width W12.

Figure 8:
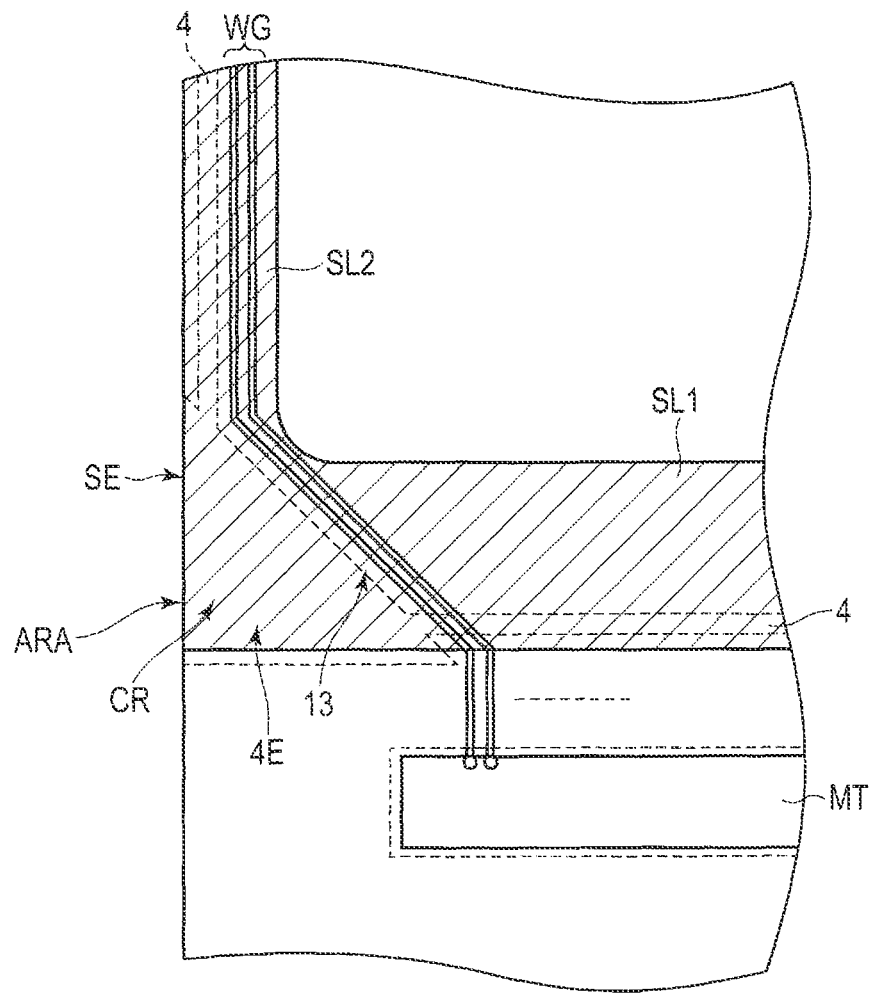
FIG. 8 is a diagram showing a fourth modification of this embodiment.

FIG. 8 shows a fourth modification according to this embodiment. As compared with the structural example shown in FIG. 2, the fourth modification is different in that the void 30 in the crossing portion CR of the sealant SE is not present. That is, the sealant SE is extended to the substrate end ARA of the array substrate AR in the crossing portion CR. Also in the sealant SE, the first seal portion SL1 is formed wider than the second seal portion SL2 as in the above-provided structural example.

With a modification such as above, an effect similar to that of the above-provided structural example can be obtained. In addition, the sealant SE of this modification can be formed by a method simpler than any of the examples provided above. An example of the method of forming the sealant SE will now be described.

FIG. 9 schematically shows a process of applying the sealant SE. In one example, sealants SE4, SE5, SE6, SE7, SE8 and SE9 are applied on one major surface of the first motherboard M1 for forming the array substrate AR (that is, the side to which the second motherboard is fixed, which later gives rise to the countersubstrate CT). Here, the figure shows a layout of the seal materials for three array substrates. Note that the order of applying the sealants SE4, SE5, SE6, SE7, SE8 and SE9 is not particularly limited. The sealants SE4, SE5, SE6, SE7, SE8 and SE9 are all applied to have substantially a fixed width W21.

The sealant SE4 is applied along a cut line CL5. The sealant SE4 is formed so that substantially the center of the width W21 thereof coincides with the cut line CL5. The sealant SE5 is applied along the cut line CL6 on a side closer to the cut line CL5. The sealant SE6 is applied along a cut line CL1. The sealant SE6 is formed so that substantially the center of the width W21 thereof coincides with the cut line CL1. The sealant SE7 is applied along a cut line CL2. The sealant SE7 is formed so that substantially the center of the width W21 thereof coincides with the cut line CL2. The sealant SE8 is applied along a cut line CL3. The sealant SE8 is formed so that substantially the center of the width W21 thereof coincides with the cut line CL3. The sealant SE9 is applied along a cut line CL4. The sealant SE9 is formed so that substantially the center of the width W21 thereof coincides with the cut line CL9.

When the first motherboard M1 illustrated and the second motherboard not illustrated are attached together and then cut along the cut lines CL1 to CL6, the sealants SE4, SE6 to SE9 are made to have a width W22 which is the half of the width W21. On the other hand, in the regions of the array substrates AR1 to AR3, the sealing portions formed along the mount units MT1 to MT3 are each formed of the sealant SE5 having the width W21. That is, the width of the sealing portions formed along the mount units MT1 to MT3 is substantially twice as large as that of the sealing portions formed along the other three sides. According to such a method of forming a sealant SE, a sealing portion formed along a mount unit can be formed wider than the portions along the other sides without applying the seal material twice or more.

Note that the sealant SE4 is not necessarily required to overlap the cut line CL5, but the sealant SE4 may be applied along the cut line CL5 on a side closer to the cut line CL5.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first substrate comprising a first area and a second area;
a second substrate comprising a substrate end and opposing the first area of the first substrate;
a sealant that attaches the first substrate and the second substrate together in the first area;
an organic insulating film formed over the first area and the second area; and
a drive IC mounted on the first substrate in the second area, wherein
the second area of the first substrate is an area where the first substrate is exposed from the second substrate,
the substrate end is a boundary between the first area and the second area,
the organic insulating film includes a removed portion in a region where the drive IC is arranged in the second area, and
the organic insulating film surrounds the removed portion and the drive IC in the second area.

2. The display device of claim 1, wherein the organic insulating film is disposed from the removed portion to the substrate end in the second area.

3. The display device of claim 2, further comprising:
a wiring connected to the drive IC in the removed portion, wherein
the wiring is drawn from the drive IC to the first area,
the wiring crosses the substrate end in planar view, and
the wiring is covered by the organic insulating film in the second area.

4. The display device of claim 2, wherein
the organic insulating film further includes a groove portion that extends along the substrate end in the first area,
the groove portion is located closer to the substrate end than the drive IC,
a first side wall of the organic insulating film that defines a part of the groove portion is located in the first area, and
the first side wall is a part of the organic insulating film that is disposed from the removed portion to the substrate end in the second area.

5. The display device of claim 4, wherein
a second side wall of the organic insulating film that defines a part of the groove portion is located in the second area, and
the second side wall is a part of the organic insulating film that is disposed from removed portion to the substrate end in the second area.

6. The display device of claim 5, wherein
a third side wall of the organic insulating film that defines a part of the groove portion is connected to the first side wall and the second side wall, the third side wall crosses the substrate end in planar view, and the third side wall is a part of the organic insulating film that is disposed from the removed portion to the substrate end in the second area.

7. The display device of claim 5, further comprising:
a wiring connected to the drive IC in the removed portion, wherein the wiring is drawn from the drive IC to the first area,
the wiring crosses the substrate end in planar view,
the wiring is covered by the organic insulating film in the second area,
the wiring crosses the first side wall in planar view, and
the wiring does not cross the second side wall in planar view.

8. The display device of claim 7, wherein
the wiring is an outermost circumferential wiring formed closest to a substrate end of the first substrate that extends to a direction intersecting to the substrate end of the second substrate.

9. The display device of claim 5, wherein
the sealant overlaps the groove portion,
the first side wall overlaps the sealant, and
the second side wall does not overlap the sealant.

\* \* \* \* \*